Figure 1:
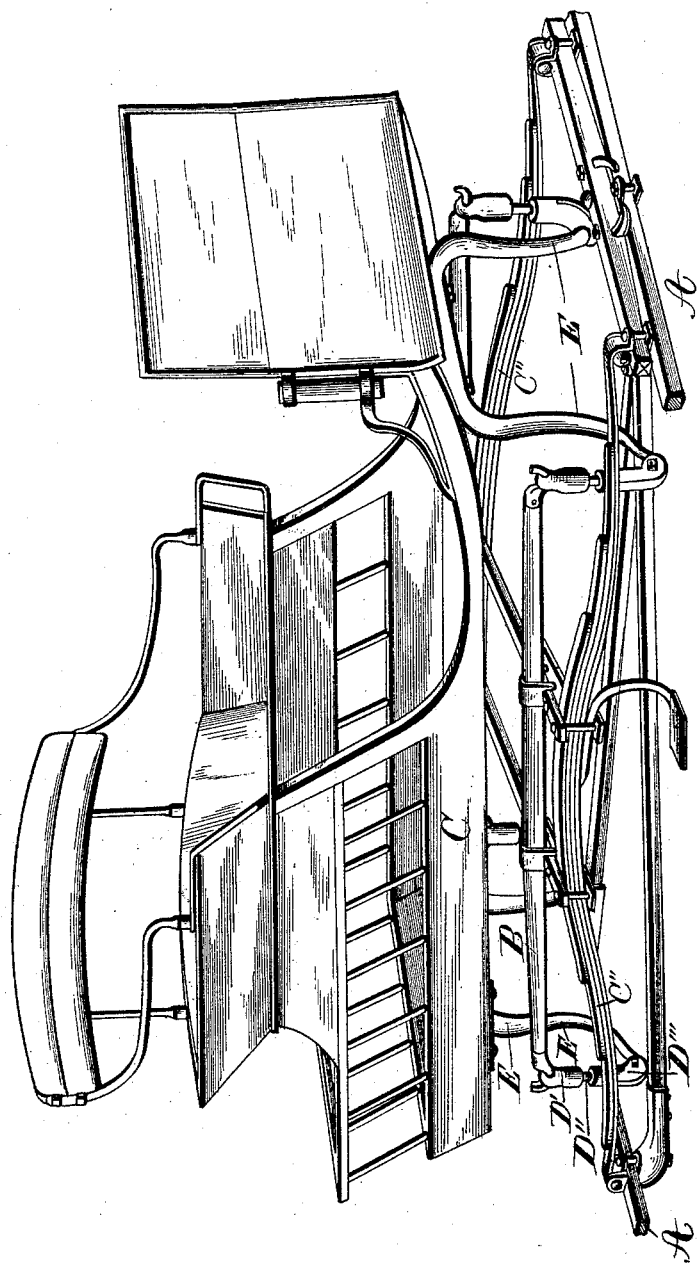

(No Model.)  2 Sheets—Sheet 1.

J. T. WESTWOOD.
VEHICLE SPRING GEAR.

No. 421,365. Patented Feb. 11, 1890.

WITNESSES

INVENTOR

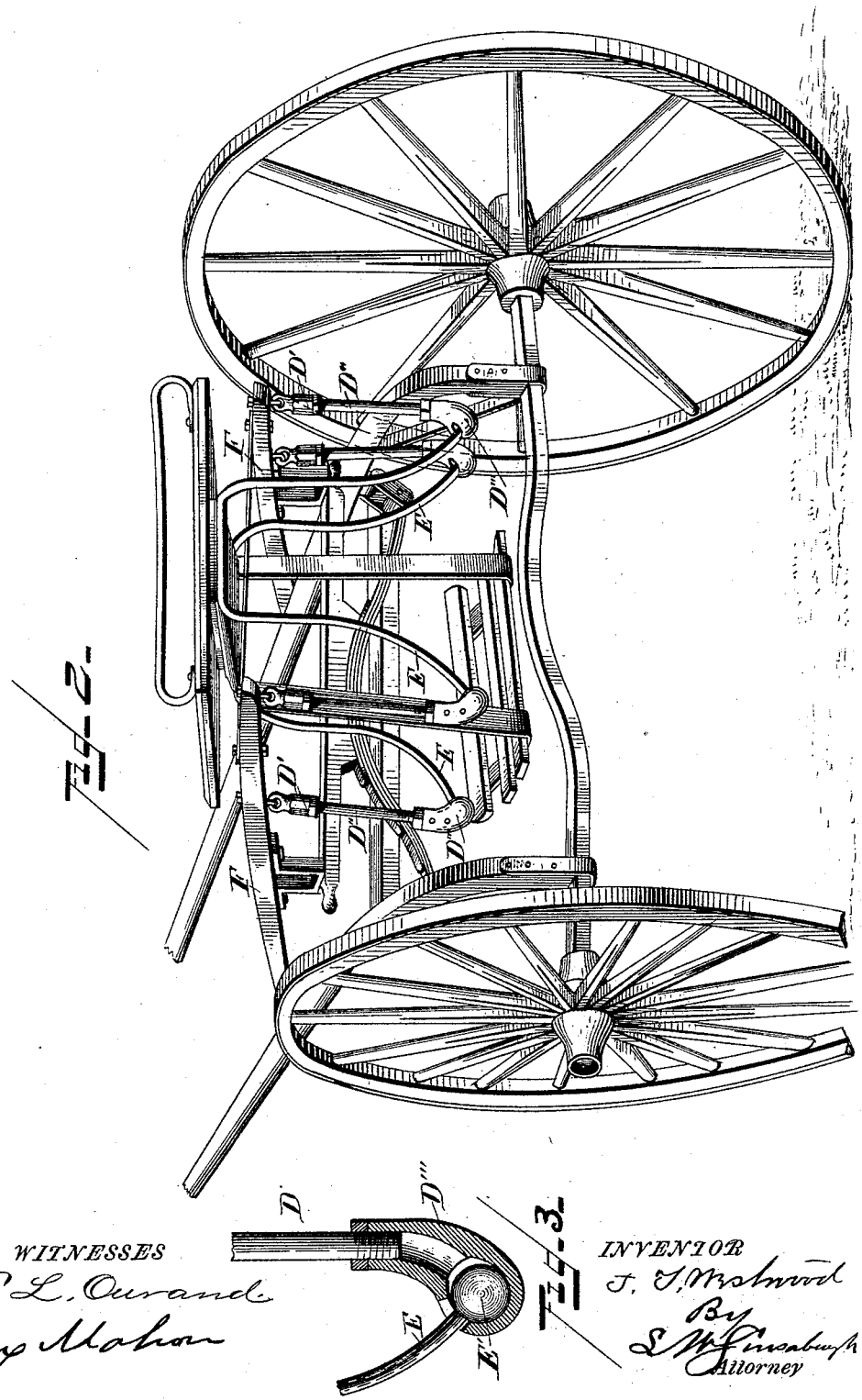

UNITED STATES PATENT OFFICE.

JOHN T. WESTWOOD, OF WHEELING, WEST VIRGINIA, ASSIGNOR OF ONE-HALF TO BENJAMIN FISHER, OF SAME PLACE.

VEHICLE SPRING-GEAR.

SPECIFICATION forming part of Letters Patent No. 421,365, dated February 11, 1890.

Application filed September 19, 1889. Serial No. 324,413. (No model.)

*To all whom it may concern:*

Be it known that I, JOHN T. WESTWOOD, a citizen of the United States, residing at Wheeling, in the county of Ohio and State of West Virginia, have invented new and useful Improvements in Means for Connecting Vehicle Beds, Bodies, or Seats with the Running-Gear; and I do hereby declare the following to be a full, clear, and exact description of said invention, reference being had to the accompanying drawings, and to the letters of reference marked thereon, which form a part of this specification.

My invention relates to a novel manner of connecting a vehicle body, bed, or seat with the running-gear, whereby said body, bed, or seat is caused to maintain its parallelism relative to the horizon irrespective of the irregular or angular movement of the running-gear in passing over rough or uneven surfaces or in coming in contact with obstructions, and also to prevent the so-called "horse motion" from being communicated to the seat in the two-wheeled form of vehicle.

The invention consists in connecting the body, bed, or seat to the running-gear through depending curved arms connected to the under side of the body, bed, or seat, and depending perpendicularly-arranged rods connected to the springs, said arms and rods being connected together at their lower ends by a universal or ball-and-socket connection, said parts being so arranged that while the seat is always caused to maintain its fixed relation relative to its height above the springs the irregular movement or jar consequent to passing over rough or uneven surfaces is not communicated to said body, bed, or seat; and it further consists in certain novel features in the construction and arrangement of parts, all as hereinafter described.

In the accompanying drawings, Figure 1 is a perspective view of a four-wheeled side-bar vehicle, showing my improved manner of connecting the body with the running-gear. Fig. 2 is a perspective view of a two-wheeled vehicle with my improvement applied. Fig. 3 is a section through the socket of the joint, showing the ball in full lines.

In the drawings, Fig. 1, A A represents the axle, and B B the side bars, constructed similar to the ordinary form of side-bar vehicles in general use, and C is the body, also constructed in the usual or any other preferred way. The side bars B B rest upon side springs C'', secured to and resting at their ends on the rear axle and at their front ends on the bolster. Secured to the side bars C are depending perpendicularly-arranged rods D, connected to the ends of the side bars by a hook and eye through heads D, which heads are provided with screw-threaded sockets to receive one end of a rod D'', and to the lower end of which rod is connected a divided socketed head D''', hereinafter referred to.

To the under side of the frame or bed of the body of the vehicle are secured depending rigid arms E, preferably made in inverted-U form, curving outward at their lower ends, and which ends are provided with balls to be engaged by the socketed recess in the arms E or the heads D'''.

In Fig. 2 of the drawings I have shown my improvement applied to a two-wheeled vehicle, in which case the depending arms, in which the socket is formed, are connected to the rearwardly-extending side spring-bars connected to the shafts. In this case the depending arms E are connected directly to the seat—one set at the front and the other at the rear edge of the seat.

By the construction herein described it will be seen that the rods stand in a perpendicular position, and that the arrangement is such that while the seat is always caused to maintain its fixed relation relative to its height above the springs that the irregular movement or jar consequent to passing over rough or uneven surfaces is not communicated to said body, bed, or seat, as before stated.

Having now described my invention, what I claim, and desire to secure by Letters Patent, is—

1. A vehicle body, bed, or seat connected and supported from the running-gear through depending curved rigid arms and depending perpendicularly-arranged rods, having the seat elevated above the spring side bars, said arms and rods being connected together at their lower ends by a universal or ball-and-socket connection, substantially as described.

2. The combination, in a four-wheeled side-bar vehicle, of depending rigid arms connected to the bed or body and extending to each side bar, depending perpendicularly-arranged rods connected to the spring side bars through pivotal connections, and a universal or ball and socket for connecting the lower ends of the rods and bars, substantially as described.

In testimony whereof I affix my signature in the presence of two subscribing witnesses.

JOHN T. WESTWOOD.

Witnesses:
WILLIAM B. FISHER,
GEO. W. FOX.